United States Patent [19]
Black et al.

[11] Patent Number: 5,791,374
[45] Date of Patent: Aug. 11, 1998

[54] CHECK VALVE FOR THE PRE-COMBUSTION CHAMBER OF AN INTERNAL COMBUSTION ENGINE

[76] Inventors: Art Black, 476 Wilcrest, Houston, Tex. 77042; Tom Riggs, 22602 Bobolink Cir., Tomball, Tex. 77375

[21] Appl. No.: 568,990

[22] Filed: Dec. 7, 1995

[51] Int. Cl.[6] .................................................. F16K 15/00
[52] U.S. Cl. ............................. 137/519.5; 137/533.15; 137/533.11; 123/267
[58] Field of Search ..................... 137/533.15, 533.11, 137/533, 519.5; 123/267; 239/533.2, 533.15, 570, 571, 545

[56] References Cited

U.S. PATENT DOCUMENTS

| | | | |
|---|---|---|---|
| 1,790,480 | 1/1931 | Macomber et al. | 137/519.5 |
| 2,578,069 | 12/1951 | Jones | 137/533.15 |
| 3,213,839 | 10/1965 | Gitlin | 123/267 |
| 3,759,281 | 9/1973 | Falcuta | 137/519.5 |
| 3,770,001 | 11/1973 | Davis | 137/519.5 |
| 3,908,625 | 9/1975 | Romy | 123/267 |
| 4,120,315 | 10/1978 | Snyder | 137/519.5 |
| 4,338,897 | 7/1982 | Drumheller et al. | 123/267 |
| 4,633,681 | 1/1987 | Webber | 137/533.11 |
| 4,756,335 | 7/1988 | Kim | 137/519.5 |
| 4,945,947 | 8/1990 | Westra et al. | 137/519.5 |

FOREIGN PATENT DOCUMENTS 2153219  5/1973  Germany ........................... 123/267

Primary Examiner—Denise L. Ferensic
Assistant Examiner—Joanne Y. Kim
Attorney, Agent, or Firm—Butler & Binion, L.L.P.

[57] ABSTRACT

A check valve assembly is adapted to be installed in a pre-combustion chamber for an internal combustion engine. The check valve includes a ball closure element which is responsive to normal fuel/air supply pressure to be held in an open position and is responsive to expansion pressure in the chamber to close the supply line and to prevent back flash of ignited fuel into the supply line.

5 Claims, 1 Drawing Sheet

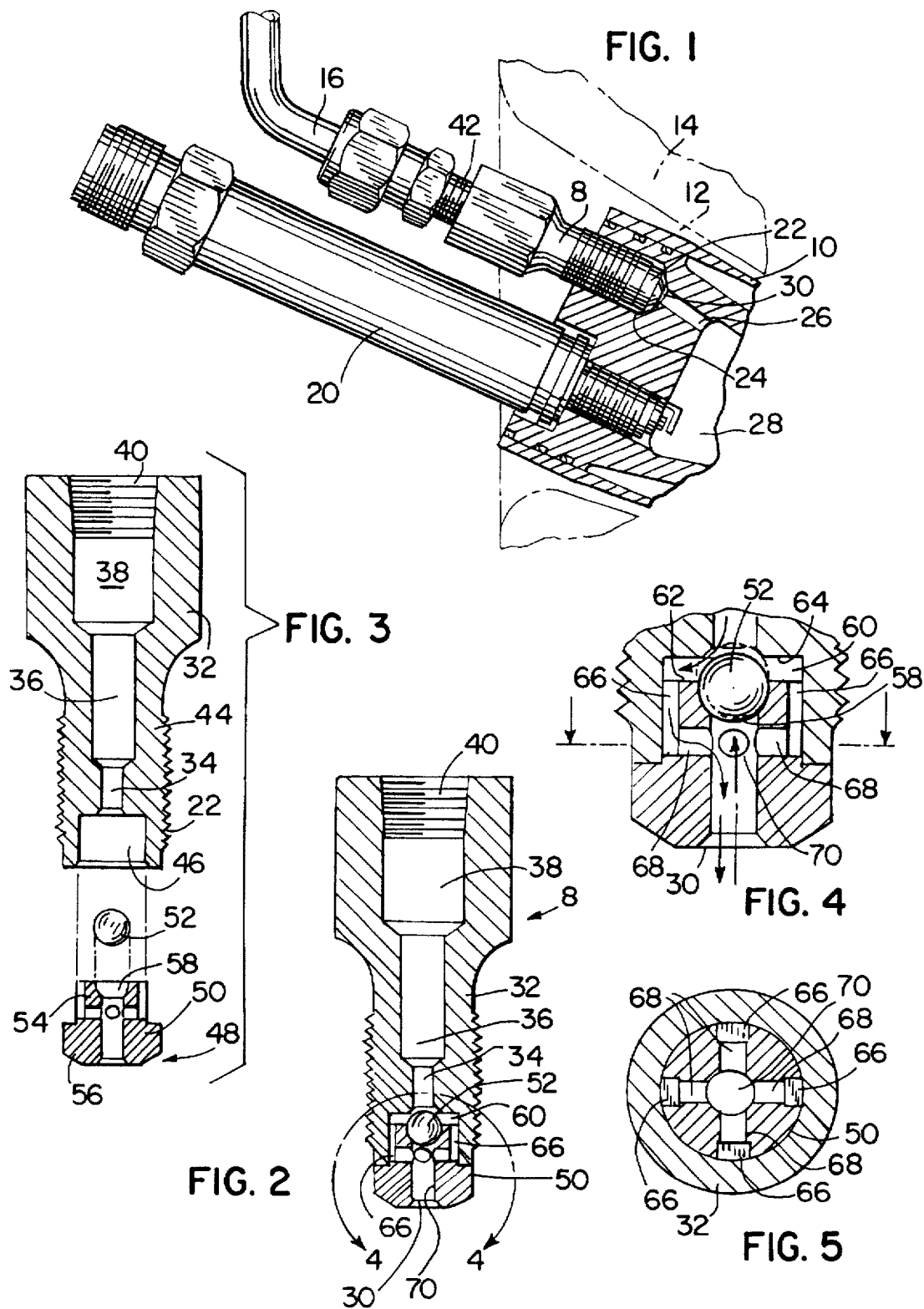

CHECK VALVE FOR THE PRE-COMBUSTION CHAMBER OF AN INTERNAL COMBUSTION ENGINE

BACKGROUND OF THE INVENTION

1. Field of the Invention

The subject invention generally relates to a check valve assembly and is particularly directed to a check valve assembly for controlling the flow of fuel/air into a pre-combustion chamber of the type used for reducing emissions in internal combustion engines.

2. Description of the Prior Art

The use of a pre-chamber in an engine cylinder head is well known. As early as 1876, an Otto engine included an explosion canal in the cylinder head to improve ignition and enhance combustion. The explosion canal was designed to draw in a rich mixture at the very end of the intake stroke, whereby that portion of the charge was exposed to the igniter flame, creating a strong jet of flame which blasted into the combustion chamber for ensuring a quick, positive burning of the total charge. Pre-chamber technology was routinely utilized in high speed racing engines of the 1920's. Cooper-Bessemer incorporated a jet cell in 1938 to achieve charge stratification in the combustion chamber.

The original application of the pre-chamber in gas engines was in the Fairbanks-Morse two-cycle opposed piston engine, used extensively in the electric power generation industry. While the initial interest in pre-combustion chamber technology was to permit use of alternative fuels or to even out the operation of inefficient engines at low speed and low load, this technology has current value because of the emission reduction resulting from the use of pre-combustion systems, even in today's more efficient engines. With the enactment of the Clean Air Act of 1977, conventional engines could no longer meet the emission requirements.

Recently, a number of designs have been tried to improve the emission rating of such engines. One such design is the Cooper CleanBurn design which employs a jet cell igniter installed in the conventional head in place in one of the spark plug wells. The jet cell igniter incorporates a small pre-chamber into which a conventional spark plug is installed and an additional supply of fuel is introduced through a check valve. The timing of the auxiliary fuel supply into the cylinder is accomplished by the differential pressure existing across the check valve. When pressure in the main cylinder and pre-chamber is lower than the fuel supply pressure to the igniter, the check valve will open and fuel will flow into the pre-chamber. When the main chamber and pre-chamber pressure rises to a level higher than the auxiliary fuel supply pressure the check valve will close and block the flow of auxiliary fuel.

More recently, pre-chambers have been incorporated in both four-cycle and two-cycle engines in order to reduce emission levels. While very successful in achieving lower emissions, the cost factor in upgrading to engines including pre-chambers in prohibitive. While many engines are "grandfathered" in, it is becoming more and more difficult to meet emission requirements without use of a pre-chamber.

One of the important aspects of use of a pre-combustion chamber is to assure that the fuel/air mix introduced directly into the pre-combustion chamber in the vicinity of the spark does not flash back into the fuel/air delivery line upon ignition. While check valve assemblies, in general, are well known, none are particularly well-suited for use in pre-combustion chambers which are designed to fit in small cavities in the engine, such as a spark-plug well.

It is now possible to retro-fit older engines by placing the pre-chamber in one spark plug well. While such applications are successful in reducing emissions, a suitable check valve system is required to assure against back flash of the ignited fuel/air mixture.

SUMMARY OF THE INVENTION

The subject invention is directed to a check valve assembly particularly well suited for use in a pre-combustion chamber which is designed to fit in small cavities such as a spark plug well or the like.

The check valve assembly of the subject invention is configured to fit in a typical spark plug well along with a spark plug, with both the spark plug and the check valve being mounted in a pre-combustion chamber.

In the preferred embodiment, the pre-combustion chamber is that shown and described in our copending application, serial No. ---,---, entitled: "PRE-COMBUSTION CHAMBER FOR INTERNAL COMBUSTION ENGINE AND METHOD OF MANUFACTURE THEREOF", filed on even date herewith and incorporated by reference herein. The pre-combustion chamber there shown incorporates an integral design having a lower tip including an external thread adapted to be received in a suitably tapped spark plug hole. A sealing gasket, such as by way of example, a conventional spark plug gasket is placed between the engine head and the chamber. The pre-combustion chamber is in-line with the spark plug hole and is double walled to permit external cooling of the chamber. The inner wall defines the pre-combustion chamber. The outer wall is spaced outwardly from the inner wall and forms a jacket surrounding the pre-combustion chamber. The space between the walls defines a cooling jacket of a suitable coolant, such as water, permitting the heat of the pre-combustion chamber to be dissipated. A fuel inlet and fuel delivery system introduces fuel into the pre-combustion chamber in the well-known manner. The spark plug is mounted in direct communication with the pre-combustion chamber. In operation, the spark plug is utilized to ignite the fuel rich/air ratio in the pre-combustion chamber, generating an ignition flame which is released through the lower tip of the pre-combustion chamber to ignite the fuel lean/air ratio in the main combustion chamber.

The check valve is mounted adjacent to the spark plug in the outer end of the pre-combustion chamber. the fuel/air line is connected directly to the check valve assembly. In the preferred embodiment, the check valve comprises a substantially cylindrical body with an externally threaded outer end adapted to be received in a suitably threaded inlet port in the pre-combustion chamber. A central bored passageway is provided for introducing the fuel/air mix into the pre-combustion chamber. The lower end of the assembly includes a removable cap piece which is bored and channeled to provide passageways for the fuel/air. A ball valve closure member is positioned between the cap piece and the body. In operation, the pressure in the fuel/air line forces the ball into the opened position to permit the fuel/air to flow through the cap piece and into the pre-combustion chamber. Once the fuel/air is ignited in the pre-combustion chamber, the rapid expansion of the fuel/air mix therein causes the pressure in the chamber to be greater than that in the fuel/air line, and forces the ball to the closed position to prevent back flash into the fuel/air line, forcing all of the ignited fuel/air mix into the main combustion chamber of the engine through the original spark plug hole.

It is, therefore, an object and feature of the subject invention to provide an improved check valve assembly for a pre-combustion chamber which is adapted to be retrofitted into the spark plug well of an existing internal combustion engine.

It is another object and feature of the subject invention to provide a check valve assembly which is of compact design an is capable of being placed in small cavities of an engine or the like.

Other objects and features of the invention will be readily apparent from the drawings and the detailed description of the preferred embodiment.

BRIEF DESCRIPTION OF THE DRAWINGS

FIG. 1 is a partial cross-section of an internal combustion engine with the pre-combustion chamber of the subject invention installed in a spark plug hole thereof, including the check valve assembly of the subject invention.

FIG. 2 is an enlarged view of a longitudinal cross section of the check valve assembly shown in FIG. 1.

FIG. 3 is a view looking in the same direction as FIG. 2, with the check valve disassembled.

FIG. 4 is an enlarged partial view similar to FIG. 2, showing the ball closure mechanism is greater detail.

FIG. 5 is a section view taken along line 5—5 of FIG. 4.

DETAILED DESCRIPTION OF THE PREFERRED EMBODIMENTS

The check valve assembly 8 of the subject invention is shown in FIGS. 1-5, with the check valve shown assembled in a pre-combustion chamber in FIG. 1. The pre-combustion chamber 10 of the preferred embodiment is more clearly described in our copending application, serial No. ---,---, entitled: "PRE-COMBUSTION CHAMBER FOR INTERNAL COMBUSTION ENGINE AND METHOD OF MANUFACTURE THEREOF", filed on even date herewith and incorporated by reference herein. The pre-combustion chamber 10 is typically installed in the spark plug well 12 of a standard engine 14, shown in phantom. A fuel supply line 16 is connected directly to the chamber assembly through the check-valve 8. The spark plug 20 is installed directly in the pre-combustion chamber 10. In operation, a fuel is introduced directly into the pre-combustion chamber through line 16 and check valve 8 and ignited by spark plug 20. The ignited fuel/air mix, then expands and is expelled through the nozzle at the opposite end of the chamber assembly.

In the preferred embodiment, the peripheral wall of the check valve is externally threaded at 22, and is received in the mated, tapped hole 24 in the pre-combustion chamber. An inlet canal 26 communicates the outlet port 30 of the check valve with the expansion chamber 28 of the pre-combustion chamber assembly 10.

As shown in FIGS. 2 and 3, the check valve assembly includes a valve body 32 with a central through bore 34. The bore is enlarged at 36 and at 38. The outer end 40 of the enlarged section 38 is threaded to receive the mated threaded coupling or fitting 42 on the end of the fuel/air delivery line 16. The lower end 44 of the body is dimensioned to fit within the opening 24 provided in the pre-combustion chamber 10 and is externally threaded at 22.

An additional enlarged bore or recess 46 is provided at the lowermost end of the body 32. This recess 46 defines a seat for the ball valve assembly 48, comprising the closure piece 50 and the ball 52. The reduced portion 54 of the closure piece 50 is dimensioned to form a plug fit with the recess cavity 46 for securing the closure piece 50 in assembled relationship with the body 32, as best shown in FIGS. 2 and 4. The enlarged portion 56 of the closure piece 50 has an outer perimeter which corresponds to the peripheral wall of the valve body 32, also best seen in FIGS. 2 and 4.

As best shown in FIG. 4, the closure piece 50 includes a ball seat 58, for receiving the ball 52. When assembled, there is a gap 60 between the upper end 62 of the closure piece 50 and the lower end 64 of the valve body. As best seen in FIG. 5, the closure piece is provided with a plurality of longitudinal channels 66 which communicate with the gap 60. A plurality radial passages 68 provide communication between the channels 66 and the central bore 70 of the closure piece.

In operation, the ball 52 is forced into the seat 58 when the fuel/air is introduced into the line 16 and therethrough into the valve body 32. This permits the fuel/air to enter the gap 60 and flow therethrough into and through channels 66 and passages 68 to be released through central bore 70 and outlet port 30 into the chamber 28 (see FIG. 1).

Once the fuel/air is ignited in chamber 28, its rapid expansion causes an increase in pressure, which is introduced back into the valve assembly via port 30. The increase in pressure overcomes the pressure of flow in the line 16 and forces the ball 52 up against the end of bore 34, closing off fuel flow and sealing the fuel/air line against any backflash of the ignited mixture. As soon as the pressure in chamber 28 drops below the normal pressure in the line 16, the ball 52 returns to the seat 58 and fuel/air flow resumes.

While certain embodiments and features of the invention have been described in detail herein, it will be readily understood that the invention incorporates all enhancements and modifications within the scope and spirit of the following claims.

What is claimed is:

1. A ball-type check valve having an elongated, axial profile and adapted to be placed in parallel relationship with a substantially cylindrical spark plug in a threaded socket in the spark plug well of the pre-combustion chamber of an internal combustion engine, the check valve comprising:

a. a body having an axial central bore with opposite open ends;

b. one end having a cylindrical peripheral body portion including external threads adapted to be received in the threaded socket for defining an outlet of said body;

c. an opposite internally threaded end adapted for receiving an externally threaded connector adapted for connecting a fuel supply line to the check valve;

d. a closure assembly mounted on the outlet end, the closure assembly defining an open peripheral gap between the outlet end and the closure assembly, the closure assembly further including an outlet port and channels for communicating the gap with the outlet port;

e. a ball seat in the closure assembly; and f. a ball closure element in the ball seat and movable into the gap to close the outlet end and out of the gap to open the outlet end wherein fluid enters into said gap and flows into and through said channels when said outlet end is open.

2. The check valve of claim 1, wherein when the ball closure element in the ball seat is movable within the gap between the outlet end opening position and outlet end closing position, the ball is responsive to normal pressure in the fuel supply line to be held in the open position, permitting the fuel to enter the gap, and being responsive to the expansion pressure in the pre-combustion chamber upon ignition of fuel therein to close the outlet end of the body and prevent fuel from entering the gap.

3. The closure assembly of claim 1, wherein the channels comprise:
   a. longitudinal channels along the outside of the closure assembly; and
   b. radial channels extending into the closure assembly.

4. The assembly of claim 1, wherein the body includes a recess for receiving the closure assembly.

5. The assembly of claim 4, wherein the closure assembly is dimensioned to form a plug fit with the body when mounted in the recess.

* * * * *